UNITED STATES PATENT OFFICE.

LUDWIG MOND, OF NORTHWICH, COUNTY OF CHESTER, ENGLAND.

PROCESS OF OBTAINING HYDROCHLORIC ACID FROM THE RESIDUES OF AMMONIA-SODA MANUFACTURE.

SPECIFICATION forming part of Letters Patent No. 299,830, dated June 3, 1884.

Application filed January 9, 1884. (No specimens.)

*To all whom it may concern:*

Be it known that I, LUDWIG MOND, residing in Northwich, county of Chester, Kingdom of Great Britain and Ireland, have invented a new and useful Method for Obtaining Hydrochloric Acid as a By-Product of the Ammonia-Soda Manufacture, of which the following is a specification.

Hitherto hydrochloric acid has only been obtained as a by-product in the manufacture of soda by the process of Leblanc. The main product of this process—namely, the soda—has, however, for a number of years been made at a considerably lower cost by means of the so-called "ammonia process." In consequence hereof the manufacture of soda after Leblanc's method, and the production of hydrochloric acid as a by-product thereof, has of late decreased, and the price of the latter has risen by so much that various branches of industry dependent upon a cheap supply of hydrochloric acid are seriously menaced in their existence. Numerous attempts to obtain hydrochloric acid as a by-product in the manufacture of soda by the ammonia process have hitherto been unsuccessful. According to my invention I treat chloride of sodium, preferably in the form of natural brine, by the well-known ammonia-soda process; but in place of continually recovering the ammonia by acting with lime upon the solutions of the chloride of ammonium obtained, I evaporate the said solutions, and after separating the chloride of sodium which they invariably contain, and which salts out during the evaporation, I treat with sulphuric acid the concentrated solution or the solid chloride of ammonium obtained therefrom by crystallization or complete evaporation. I thus obtain a pure hydrochloric-acid gas, which can be condensed or utilized in any known way, and obtain as a secondary product sulphate of ammonia—a valuable article of commerce. By these operations I also save the lime now employed in the treatment of the liquors produced in the ammonia-soda process. At present large quantities of sulphuric acid are used in manufacturing sulphate of ammonia from the ammoniacal liquors of gas-works and of other origin. My invention makes available these large quantities of sulphuric acid for producing hydrochloric acid as a secondary product.

The ammonia obtained by distillation from the ammoniacal liquors above named is converted by the ammonia-soda process into chloride of ammonium, and by subsequently treating this chloride of ammonium by sulphuric acid both sulphate of ammonia and hydrochloric acid are produced.

I claim as my invention—

The method of producing hydrochloric acid from the liquors obtained in the manufacture of soda by the ammonia process, and containing chloride of ammonium and chloride of sodium, which consists in evaporating these liquors, separating therefrom the chloride of sodium, which salts out during the evaporation, and treating the remaining product by sulphuric acid, substantially as described.

In testimony whereof I have signed my name to this specification in the presence of two subscribing witnesses.

LUDWIG MOND.

Witnesses:
 H. L. SPRINGMANN,
 JOHN R. ROSLYN.